Figure 1:
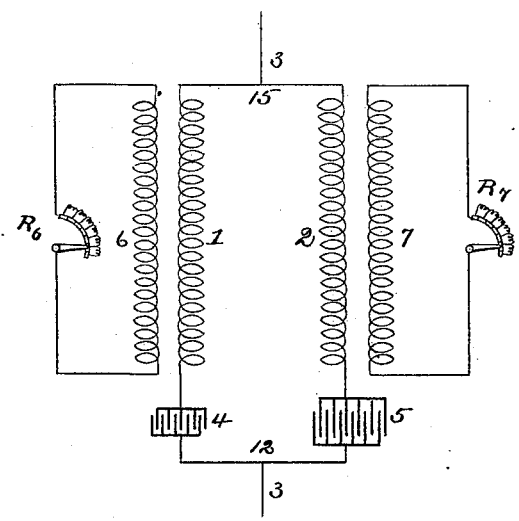

(No Model.)
2 Sheets—Sheet 1.

M. HUTIN & M. LEBLANC.
ALTERNATING CURRENT MOTOR.

No. 553,469.
Patented Jan. 21, 1896.

Witnesses:
Jos H Blackwood
F. J. Chapman

Inventors,
Maurice Hutin and
Maurice Leblanc,
By Joseph Lyons
Attorney.

(No Model.) 2 Sheets—Sheet 2.

M. HUTIN & M. LEBLANC.
ALTERNATING CURRENT MOTOR.

No. 553,469. Patented Jan. 21, 1896.

Witnesses:
Jos H Blackwood
F. T. Chapman

Inventors,
Maurice Hutin and
Maurice Leblanc,
By Joseph Lyons
Attorney

United States Patent Office.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

ALTERNATING-CURRENT MOTOR.

SPECIFICATION forming part of Letters Patent No. 553,469, dated January 21, 1896.

Application filed November 17, 1892. Serial No. 452,292. (No model.) Patented in France March 19, 1890, No. 204,456; in Germany July 31, 1890, No. 63,446; in Belgium January 9, 1891, No. 93,385; in England January 12, 1891, No. 584; in Italy January 13, 1891, XXV, 28,966, LVII, 14; in Spain March 5, 1891, No. 11,690; in Austria-Hungary June 16, 1891, No. 3,851 and No. 22,375, and in Switzerland September 12, 1891, No. 3,968.

*To all whom it may concern:*

Be it known that we, MAURICE HUTIN and MAURICE LEBLANC, citizens of the Republic of France, and residents of Paris, France, have invented certain new and useful Improvements in Alternating-Current Dynamo-Electric Motors, (for which patents have been obtained in France, dated March 19, 1890, No. 204,456; in Germany, dated July 31, 1890, No. 63,446; in Italy, dated January 13, 1891, XXV, 28,966, LVII, 14; in Spain, dated March 5, 1891, No. 11,690; in Belgium, dated January 9, 1891, No. 93,385; in England, dated January 12, 1891, No. 584; in Austria-Hungary, dated June 16, 1891, No. 3,851 and No. 22,375, and in Switzerland, dated September 12, 1891, No. 3,968,) of which the following is a specification.

Our invention has reference to improvements in alternating-current motors and in the method of operating the same, the object of the invention being to so construct and operate alternating-current electric motors that the torque of the armature or rotating part shall be a constant maximum whatever the speed of rotation may be. Alternating-current motors of this character are of the general type known as "rotary" field-motors—that is to say, motors in which the rotation of a magnetic field of force is produced by two or more currents which are dephased with reference to each other. By preference we produce a rotating magnetic field of force for the operation of our motor by currents derived from a monophase circuit. Our invention, however, is not dependent upon any particular mode of producing the rotary field in force, and while we shall hereinafter describe our preferred method and means for the production of such rotary field of force we do not mean to claim the same in this case, since this is an invention which is claimed by us in our Letters Patent No. 536,032, granted March 19, 1895.

Broadly speaking, our invention consists in a method of producing constant torque in alternating-current motors having rotary fields, consisting in closing the armature or induced circuits upon like resistances and reducing and increasing the said resistances both to the same extent as the speed of the armature increases and decreases, respectively. All this will more fully appear from the following detail description, with reference to the accompanying drawings, in which—

Figure 3:
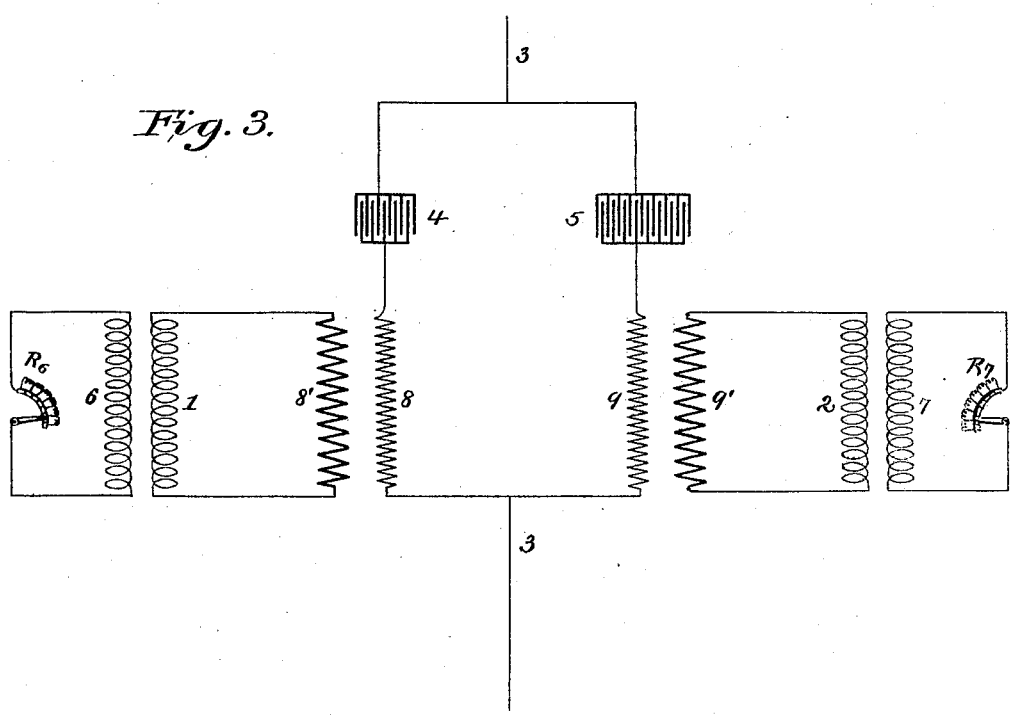
Figure 4:
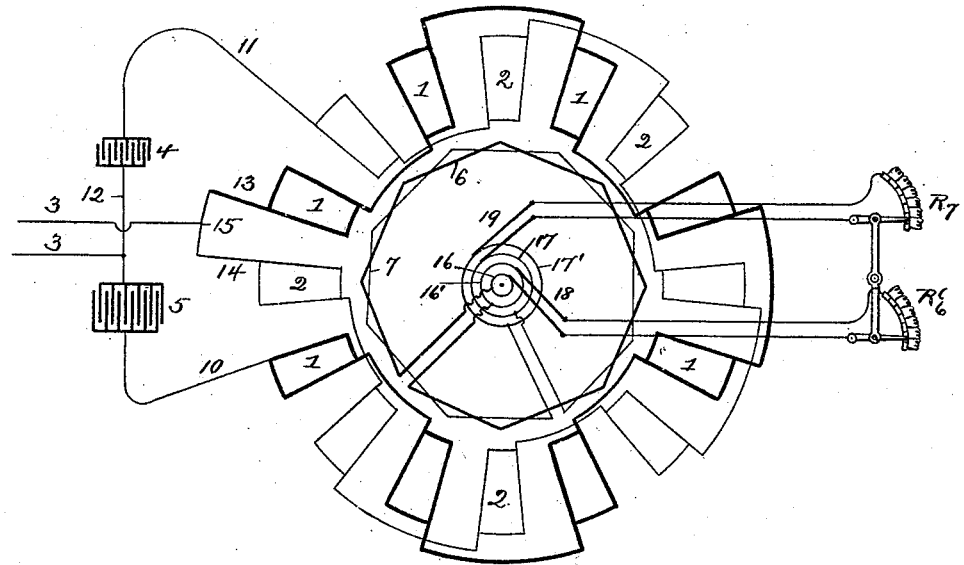
Figure 5:
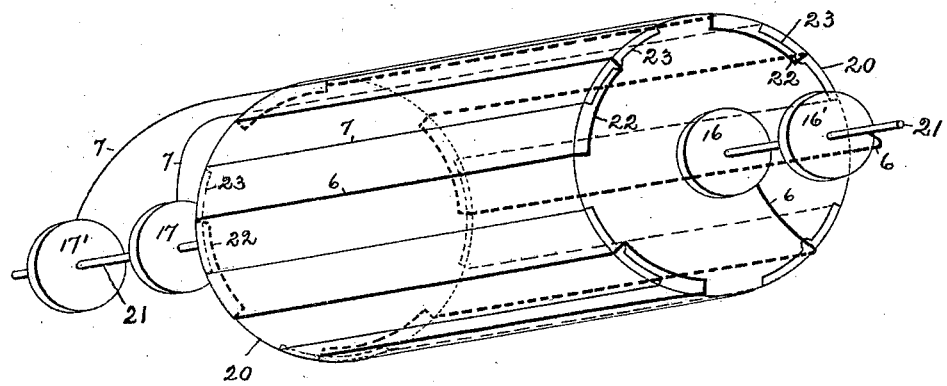

Figures 1, 2, 3, and 4 are diagrams illustrating induction-motors equipped with our invention, and Fig. 5 is a diagram illustrating the winding of the armature.

Like numerals and letters of reference indicate like parts throughout the drawings.

Referring now particularly to Fig. 1, the two field-magnet coils or sets of field-magnet coils 1 2 of a two-phase motor are shown connected in multiple-arc branches of the main line 3 3, which is understood to extend to a generator of monophase alternating currents. In the two branches are the condensers 4 5, respectively. One of these condensers, 5, has a greater capacity than the other, whereby the currents diverted through the two branches are dephased with reference to each other. The capacities of the condensers are so chosen as to produce the required shift of phase. If, as in the present instance, there are two sets of field-magnet coils, the difference of phase to be produced will be one-quarter of a wave, but if three or more sets of field-magnet coils are used the differences of phases will be different. In this manner the polar line or lines of the field are rotated with uniform speed, as is well known to those skilled in the art.

We use in our motor two independent armature-coils or sets of armature-coils 6 7, arranged in inductive proximity to the field, and each of these sets of coils is closed upon an adjustable resistance $R_6$ $R_7$, respectively. These resistances are equal and are gradually cut out in both circuits alike from the moment when the armature starts, so that as the speed of the armature increases the resistance of each armature-circuit is decreased, but so that at each moment the resistances of the two circuits are equal. The effect of this arrangement is that the torque of the armature remains sensibly constant whatever the speed of the armature may be.

If there are more than two sets of independent armature-coils, it will be understood, without further explanation, that each set of coils will be closed upon an adjustable resistance, and that all these resistances will be equal and will be equal from moment to moment—that is to say, they will be adjusted simultaneously and equally.

We have found by theoretical considerations and have verified it in practice that if the number of poles of a machine with a rotary field is designated by $2n$, the period of the polyphase alternating currents which produce the rotary field by T, the speed of rotation of the armature by $\Omega$, and the self-induction of each of the armature-circuits by L, then, other things being equal, the couple of forces which causes the rotation of the armature will be a maximum and independent of the speed of rotation if the resistance R of each set of armature-coils is adjusted from moment to moment to have the relation to the speed of the armature which is expressed by the formula:

$$R = 2\pi L\left(\frac{1}{T} - n\Omega\right).$$

In this formula $\frac{1}{T} - n\Omega$ expresses the frequency of the currents induced in the armature-coils. Consequently, in order that the torque of the rotating element be maintained at a constant maximum the resistances in its circuits must be varied in direct ratio to the frequency of the currents induced therein.

Figure 2:
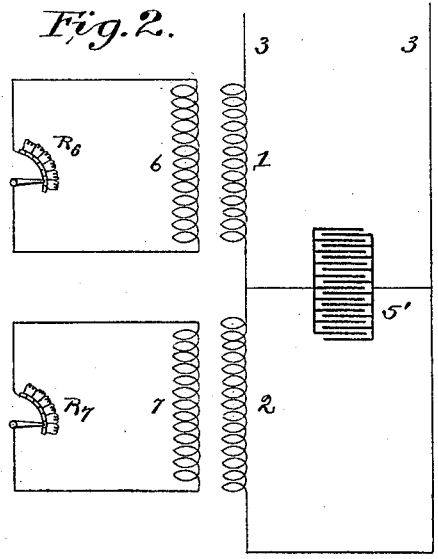

Instead of the arrangement shown in Fig. 1, we may adopt the arrangement graphically represented in Fig. 2. Here the two sets of field-windings 1 2 are in series, and between them and the return-conductor is interposed a condenser 5' of suitable capacity to dephase the currents in the coils 1 with respect to those in the coils 2. The two armature-circuits closed upon the rheostats $R_6 R_7$ would then be constructed and adjusted similar to those shown in Fig. 1.

The arrangement represented in Fig. 3 is the one which may be adopted when, between the prime generator and the motor, the currents are to be transformed. In this case two primary transformer-coils 8 9 are each in a multiple-arc branch from the main line 3 3, which carries the monophase currents, and the dephasing-condensers 4 5 are placed in these branches. In the circuit of the secondary coil 8' is one set of field-coils, 1, and in the circuit of the secondary coil 9' is the other set of field-coils, 2, while the armature-coils 6 and 7 are closed upon the equal rheostats $R_6 R_7$, which, as is now understood, must be adjusted together so as to give to each armature-circuit approximately the total resistance defined in the formula given above.

Numerous other arrangements may be made without deviating from the fundamental principles of our invention, as will be readily understood by those skilled in the art.

A practical arrangement of the parts of our improved motor is diagrammatically represented in Fig. 4. Upon a laminated ring-core (not shown) are wound the series of coils 1 1 1 and alternating with them the series of coils 2 2 2, like the coils of a Gramme ring. One terminal, 10, of coils 1 is connected with one terminal, 11, of coils 2, by a bridge-wire 12, into which are inserted the condensers 4 and 5, and between them one of the feeding-conductors, 3, connects with the bridge-wire 12. The other terminal, 13, of coils 1 is connected with the second terminal of coils 2 by a bridge-wire 15, and from this latter the second feeding-conductor 3 extends. It will be seen at a glance that this arrangement is identical in principle to that shown in Fig. 1, and that the currents in the two sets of coils will be dephased both with reference to each other and with reference to the monophase currents in the line 3 3. The armature has also two sets of windings, (represented diagrammatically by the polygonal lines 6 7,) the terminals of which are connected with the collector-rings 16 16' and 17 17', respectively. Upon each set of these collector-rings bear a pair of brushes 18 19, which in turn are connected with the rheostats $R_6 R_7$, which are joined for simultaneous adjustment in any well-known or improved manner. It will be seen at once that this arrangement of rheostats connected with the two sets of armature-coils conforms to our principle of operating the motor set forth with reference to Fig. 1.

One form of armature-winding that may be employed is illustrated by perspective diagram in Fig. 5. The armature-core, which will ordinarily be a laminated iron cylinder 20, and mounted upon a shaft 21, and which has at each end two collector-disks 16 16' and 17 17', respectively, has two alternating windings 6 7, arranged in the manner shown—that is to say, each winding runs to and fro on the surface of the cylinder—with bridge-conductors 22 23 at the ends. The terminals of the winding 6 are connected with the collector-rings 16 16', and the terminals of the windings 7 are connected with the collector-rings 17 17'.

Numerous other modes of armature-windings may be employed without departing from our invention.

Having now fully described our invention, we claim and desire to secure by Letters Patent—

1. The method of producing constant torque in alternating current motors having rotary fields produced by currents with shifted phases, consisting in closing the armature circuits upon like resistances and reducing and increasing from moment to moment the said resistances, both to the same extent, as the speed of the armature increases and decreases, respectively, substantially as described.

2. The method of producing and maintaining maximum torque in alternating current motors having rotary fields produced by currents with shifted phases, consisting in closing each independent armature circuit upon a like resistance, and regulating these resistances simultaneously and equally in a direct ratio with the frequency of the currents induced in the armature circuits, substantially as described.

3. An alternating current motor having a rotary field of force and a number of like, but independent induced circuits, a like resistance in each induced circuit, and means for simultaneously varying these resistances alike, substantially as described.

4. An alternating current motor, having a rotary field of force produced by currents with shifted phases, an armature containing independent circuits, each closed upon a like resistance, and means for reducing and increasing the resistances alike as the speed of the armature increases and decreases, respectively, substantially as described.

5. A two-phase alternating current motor comprising two sets of field coils in parallel branches of a single phase alternating current circuit, condensers for shifting the phases of currents in the two branches, with reference to each other, an armature having two independent circuits, each closed upon a like resistance, and means for decreasing the said resistances alike when the speed of the armature increases and for increasing the resistances alike when the speed of the armature decreases, substantially as described.

In witness whereof we have hereunto signed our names in the presence of two subscribing witnesses.

MAURICE HUTIN.
MAURICE LEBLANC.

Witnesses:
JULES ARMENGAUD,
ROBT. M. HOOPER.